SPARK DEVELOPMENT OF PHOTOSENSITIVE VESICULAR PRINT MATERIAL

Filed July 20, 1960

INVENTORS
JOHN L. ADKISSON
PETER BETTS
CLARIS L. DONELSON
BY
ATTORNEY

United States Patent Office 3,158,480 Patented Nov. 24, 1964

3,158,480

SPARK DEVELOPMENT OF PHOTOSENSITIVE VESICULAR PRINT MATERIAL

John L. Adkisson, Peter Betts, and Claris L. Donelson, all of San Jose, Calif., assignors to International Business Machines Corporation, New York, N.Y., a corporation of New York Filed July 20, 1960, Ser. No. 44,186
1 Claim. (Cl. 96—48)

This invention relates to means for developing photosensitive vesicular print material.

Photosensitive materials exist which are sensitive to light, forming a latent image which may be developed by heat. An example of such material is known under the name of Kalfax. A description of Kalfax film is contained an article entitled "The Miraculous Bubble: A Look at Kalfax Microfilm," appearing in the Library Resources and Technical Services, vol. 3, No. 1, Winter, 1959, pp. 40–46. A typical material is a carrier containing a uniformly dispersed photosensitive diazo compound which liberates nitrogen gas on photodecomposition. The image is developed by softening the carrier to allow expansion of the nitrogen gas. The resultant bubbles form the image.

The high resolving power of these materials lends them to photorecording of documents or ledgers. In the case of the latter it is often desirable to expose only portions of the film. This permits the film to serve much the same purpose as a page or card upon which successive entries can be made. The film can be exposed and developed only one time since the development renders it unsuitable for further exposures. Due to this limitation it is necessary to use selective development where adjacent areas are to be exposed at a future time. The prior art development of heat sensitive films has generally been of an entire area, and these devices are not adaptable to selective development of small portions of the film. One such method uses heated plates which are pressed against the film to soften the carrier and develop the latent image. These plates are approximately square and have one dimension approximately equal to the width of the film. Such a plate is not satisfactory for development of small areas, since temperature control and positioning the device would be extremely difficult. The nature of the problem is better appreciated when it is recognized that this approach involves positioning a key, which must be heated to a carefully ccontrolled temperature, but which is one-tenth the size of a standard typewriter key, onto an area which is one-tenth the size of a printed page, with an accuracy ten times better than that of a full size typewriter on a full size page.

To avoid these problems, this invention contemplates the use of the heating effect of an electric arc to heat very small areas of the film, and thereby develop the latent image. By isolating the arc from the film and confining it to a small chamber having an aperture of the desired area, a closely controlled amount of heat may be transferred to an area as small as that represented by a single character on the film.

It is therefore an object of this invention to provide means for selectively developing small areas of heat sensitive films.

It is a further object of this invention to provide a process which employs an arc discharge for developing heat sensitive films.

The foregoing and other objects, features and advantages of this invention will be apparent from the following more particular description of a preferred embodiment of the invention, as illustrated in the accompanying drawings.

Figure 1:
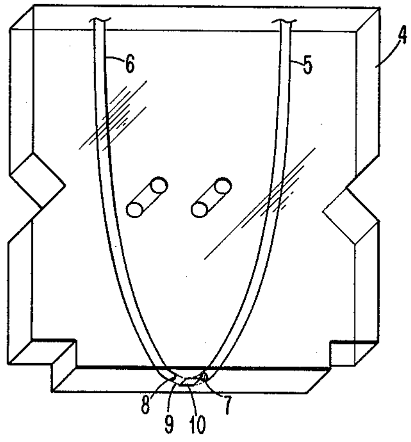
FIG. 1 is a detail of the electrodes and supporting means therefor, which also defines the arc chamber.

In FIG. 1 a block 4 is shown having electrodes 5 and 6 imbedded therein. Block 4 may be of a variety of materials, but those which possess good electrical and heat insulating properties are preferred. Electrodes 5 and 6 have extremities 7 and 8 located at opposite ends of chamber 9. An aperture 10 is provided from chamber 9 to the outside.

Figure 2:
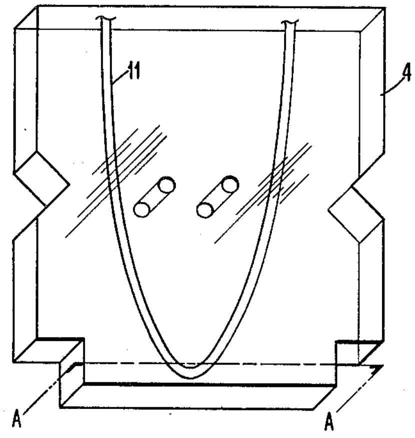
FIG. 2 is a view of the same structure as FIG. 1, but at an earlier stage in the fabrication of the device.

Such a device, as shown in FIG. 1, presents problems of fabrication which have been solved in a manner best explained with reference to FIG. 2. A continuous piece of wire 11 is embedded in the block 4 by any suitable means. This could be by laminating wire 11 between several layers of material or by casting wire into a suitable material.

When wire 11 is satisfactorily embedded in block 4, suitable means such as grinding, sawing or slicing, as appropriate for the material selected, may be used to remove a portion of the block along plane A, A. When this removal is properly accomplished, a small portion of wire 11 is exposed. This opening will be smaller than the desired aperture 10, and is enlarged by grinding or drilling to the desired shape.

An etching fluid may then be used to evacuate the arc cavity to the desired size by removing a portion of wire 11. The etching may be carried on until the proper electrode spacing is obtained. As shown in the drawing, it is desirable to have the electrodes slightly closer at the side away from aperture 10. This tends to concentrate the arc at a point away from the aperture and prevents the arc from reaching through the aperture to damage the film.

Figure 3:
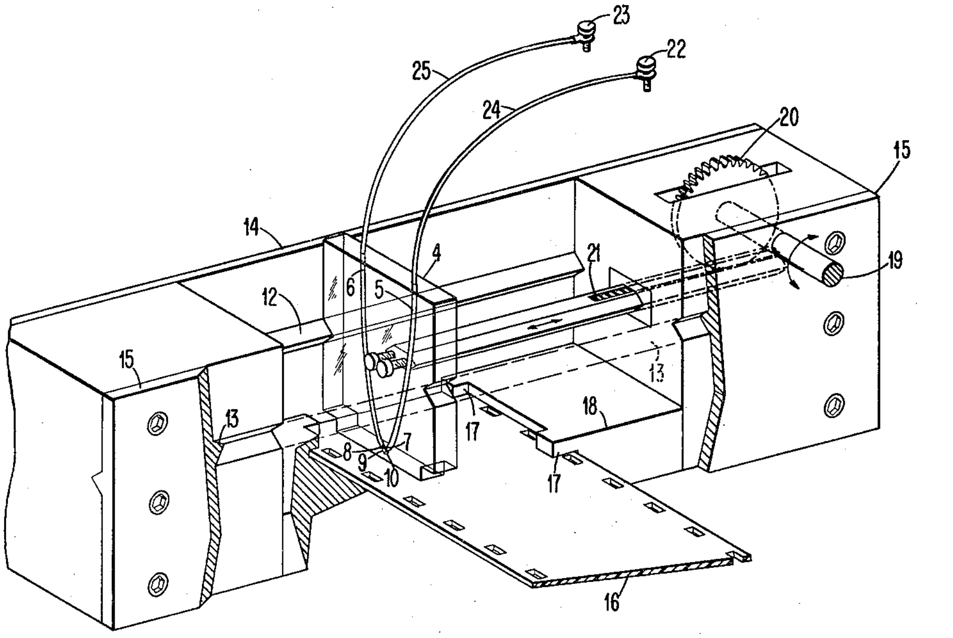
FIG. 3 is an isometric view of a device for practicing the invention.

In FIG. 3, developing head 4 is shown slidably mounted on guides 12 and 13 between side members 14 and 15. Slots in developing head 4 engage guides 12 and 13 allowing transverse movement of the head while maintaining a predetermined spacing to film 16, which passes through slots 17 in base member 18.

After a latent image has been created in film 16, a suitable means, not shown, is used to transport film 16 through the device until the image lies along a line accessible to aperture 10 of head 4. The film is then stopped and shaft 19 affixed to pinion 20 is rotated in the appropriate direction to drive rack 21, attached to head 4, to the correct position. In this manner, aperture 10 is positioned in close spaced relation to the latent image on film 16.

A source of high potential energy is then connected to terminals 22 and 23. Since electrodes 7 and 8 are connected to terminals 22 and 23 by leads 5, 24 and 6, 25, respectively, an arc is formed within cavity 9. The resultant heat escapes from cavity 9 through aperture 10 to impinge on film 16 and heat an area approximately the shape of aperture 10. The duration of the arc may be regulated to produce the temperature required for development of the film, since the arc creates a high temperature within cavity 9, a very small area may be developed by creating an arc of relatively short duration after the developing head has been properly positioned. It is obvious that a narrow strip transverse to the film could be developed by continually energizing the source connected to terminals 22 and 23, while moving head 4 relative to film 16 held motionless within guide slots 17. Such operation would be useful where a single line is to be added to previously recorded information.

In a somewhat similar manner a narrow longitudinal strip of film may be developed by holding head 4 motionless while energizing the high potential source connected to terminals 22 and 23, as film 16 is transported through the device.

While the invention has been particularly shown and described with reference to a preferred embodiment thereof, it will be understood by those skilled in the art that various changes in form and detail may be made therein without departing from the spirit and scope of the invention.

What is claimed is:

A process for the heat development of a latent image in photosensitive vesicular print material comprising the steps of:

positioning the photosensitive vesicular print material so that the latent image lies within the developable area, positioning a pair of electrodes having portions within a chamber in an insulating block so that an aperture in the chamber lies adjacent but spaced from the latent image to be developed, and heating the material in the area of the latent image with an arc discharge between the electrodes within the chamber.

References Cited in the file of this patent

UNITED STATES PATENTS

| | | |
|---|---|---|
| 1,770,493 | Ranger | July 15, 1930 |
| 2,060,985 | Frickey | Nov. 17, 1936 |
| 2,445,063 | Guyer | July 13, 1948 |
| 2,691,587 | Greig | Oct. 12, 1954 |
| 2,692,178 | Grandadam | Oct. 19, 1954 |
| 2,908,572 | Schoen | Oct. 13, 1959 |
| 2,911,299 | Baril et al. | Nov. 3, 1959 |

FOREIGN PATENTS

| | | |
|---|---|---|
| 872,637 | Great Britain | May 12, 1932 |
| 8,819/27 | Australia | Mar. 6, 1928 |
| 372,637 | Great Britain | May 12, 1932 |